United States Patent [19]

Field

[11] 4,453,375
[45] Jun. 12, 1984

[54] FEED AUGER ATTACHMENT

[76] Inventor: Robert D. Field, P.O. Box 307, Jonesville, La. 71343

[21] Appl. No.: 449,559

[22] Filed: Dec. 13, 1982

[51] Int. Cl.³ .......................................... A01D 89/00
[52] U.S. Cl. ..................................... 56/364; 56/14.6
[58] Field of Search ............... 198/693, 692, 613, 957; 56/12.4, 12.5, 14.5, 364, 14.6

[56] References Cited

U.S. PATENT DOCUMENTS

| | | |
|---|---|---|
| 1,028,739 | 6/1912 | Kibat . |
| 2,286,095 | 6/1942 | Innes ..................................... 56/364 |
| 2,476,265 | 7/1949 | Peterson . |
| 2,490,143 | 12/1949 | Magee . |
| 2,529,180 | 11/1950 | Oehler ................................... 56/364 |
| 2,612,980 | 10/1952 | Oehler . |
| 2,633,231 | 3/1953 | Pilcher .................................. 198/693 |
| 2,644,292 | 7/1953 | Oberholtz et al. ..................... 56/364 |
| 2,701,634 | 2/1955 | Carroll . |
| 2,748,921 | 6/1956 | White . |
| 2,778,483 | 1/1957 | Nikkel . |
| 2,803,505 | 8/1957 | Oberholtz .............................. 56/364 |
| 2,832,187 | 4/1958 | Johnson ................................. 56/14.5 |
| 3,142,375 | 7/1964 | Luke ..................................... 198/693 |
| 3,411,615 | 11/1960 | Schwalm ............................... 198/613 |
| 3,926,108 | 12/1975 | Doering ................................ 56/364 |
| 4,217,672 | 8/1980 | Olivari .................................. 56/364 |
| 4,266,560 | 5/1981 | Powell et al. . |
| 4,271,956 | 6/1981 | Hutchinson et al. ................ 198/693 |
| 4,290,259 | 9/1981 | Parvin et al. . |
| 4,313,449 | 2/1982 | Da Silva . |

FOREIGN PATENT DOCUMENTS 2818343 11/1979 Fed. Rep. of Germany ........ 56/364

Primary Examiner—Gene Mancene
Assistant Examiner—John G. Weiss
Attorney, Agent, or Firm—Roylance, Abrams, Berdo & Goodman

[57] ABSTRACT

An attachment is provided for a feed auger of the type having a cylindrical drum mounted for rotation about a longitudinal axis, spiral flights mounted on opposite longitudinal ends of the drum, and a central drum portion having a plurality of radially extending feed fingers. The attachment is resilient and is mounted on and extends radially from the central drum portion about the fingers. During operation of the auger, the attachment prevents the accumulation of vegetation on the auger, improves the feeding of the vegetation to the combine throat and protects the auger from damage.

22 Claims, 4 Drawing Figures

FEED AUGER ATTACHMENT

BACKGROUND OF THE INVENTION

1. Field of the Invention

The present invention relates to an attachment for a feed auger in a combine header or the like. More particularly, the invention relates to providing a resilient attachment mounted on and extending radially from the central drum portion of the feed auger about its fingers and between its spiral flights.

2. Description of the Prior Art

Conventional feed augers for combine headers comprise a cylindrical drum mounted at its ends to the header for rotation about the longitudinal axis of the drum. Spiral flights are mounted on the drum adjacent its opposite ends for conveying material towards its central drum portion. A plurality of feed fingers are mounted in the drum and extend radially from the central drum portion for conveying vegetation toward the throat of the combine header. The fingers reciprocate radially in and out of the drum as the drum rotates. Typical examples of such augers are disclosed in U.S. Pat. No. 2,701,634 to Carroll and U.S. Pat. No. 2,748,921 to White.

The principal problem in using conventional feed augers is the accumulation of vegetation on the central drum portion of the auger. During use, the accumulation of vegetation tends to clog the auger requiring the operator to shut down the combine and manually remove the vegetation from the auger central drum portion. Additionally, minor accumulations of vegetation insufficient to clog the auger dislodge the crop from the vines in the header, causing loss of the cash crop. The fingers, as well as the bolts, access doors and other protruding features on the central drum portion tend to catch the vegetation and cause the accumulation. Attempts to prevent the accumulation of vegetation on the central drum portion of the auger have involved cutting or stripping the vegetation from the fingers. Typical devices for stripping or cutting the vegetation are disclosed in U.S. Pat. No. 2,778,483 to Nikkel and U.S. Pat. No. 4,290,259 to Parvin et al.

Other problems associated with the use of conventional feed augers involve poor feeding of the vegetation and crop to the combine header throat and protection of the drum. Conventional augers have no central and effective mechanism for compensating for varying flow rates of vegetation under the auger. A high volume of vegetation tends to cause flare up, while a low volume of vegetation results in insufficient pressure being applied to the vegetation such that it may not reach the combine throat. The hard surface of the conventional auger central drum portion tends to crush and damage the crop or dislodge it from the vines causing the crop to fall to the ground rather than being fed to the combine throat. Since the conventional combine central drum portion is exposed, it is not protected from damage caused by debris picked up by the header, for example, rocks.

SUMMARY OF THE INVENTION

Accordingly, an object of the present invention is to provide a feed auger and an attachment for a feed auger which will prevent the accumulation of vegetation on the central drum portion of the auger.

Another object of the present invention is to provide a feed auger and an attachment for a feed auger which will improve feeding of vegetation by the auger to the combine header throat with reduced loss of crop.

An additional object of the present invention is to provide a feed auger and an attachment fo a feed auger which will increase the effective size of the central drum portion at a minimum cost.

A further object of the present invention is to provide a feed auger and an attachment for a feed auger which will protect the central drum portion and which will reduce the maintenance required on the feed auger.

Yet another object of the present invention is to provide an attachment for a feed auger whichis simple and inexpesive to manufacture, install on a feed auger and maintain, and which is of rugged construction.

The foregoing objects are attained by providing a feed auger for a combine header and the like, comprising a generally cylindrical drum mounted for rotation about a longitudinal axis with spiral flights mounted adjacent the longitudinal ends of the drum and a central drum portion between the flights. A plurality of feed fingers extend radially from the central drum portion. A resilient attachment is mounted on and extends radially from the central drum portion about the fingers.

The foregoing objects are also obtained by providing a resilent attachment for a feed auger of the type having a central drum mounted for rotation about a longitudinal axis, spiral flights mounted on opposite longitudinal ends of the drum, and a central drum portion with a plurality of feed fingers extending radially from the central drum portion. The attachment comprises a body member of resilient material, a plurality of openings extending through the body member for receiving the feed fingers, and a coupling mechanism, located at opposite ends of the body, for attaching the body member about the central drum portion of the auger.

A feed auger provided with the resilient attachment on its central drum portion about its fingers will essentially eliminate the problems discussed above in connection with conventional feed augers. The resilient attachment prevents the accumulation of vegetation by the relative wiping action between the feed fingers and the attachments. Covering the drum central portion with the resilient attachment prevents the vegetation from wrapping around the numerous projections on the central drum portion in addition to the fingers, thereby saving considerable operator time in having to manually remove the vegetation. Feeding of the vegetation is improved by the resiliency provided to the central drum portion by the attachment. Such resiliency will compensate for varying feed rates of vegetation providing a constant pressure on the vegetation regardless of the volume of vegetation passing under the feed auger. The constant pressure applied by the attachment, regardless of the volume of vegetation being fed, ensures that the vegetation will be properly fed to the combine throat and will prevent flare up of the material.

Additionally, the softer surface provided by the attachment will prevent the crop, e.g., beans, from being dislodged and lost from the vines prior to being fed to the combine throat. Covering the drum central portion with the attachment also protects the auger and reduces maintenance, particularly of the finger and finger bearing.

The attachment can comprise a sleeve formed of resilient material which surrounds the drum central portion and has a plurality of openings for receiving the feed fingers. The sleeve thickness is greater than the extension of the fingers from the central drum portion in their retracted positions such that when the fingers reciprocate they will be wiped completely clean as the auger rotates and will remain within the feed auger for a larger segment of the auger rotation.

To facilitate mounting of the attachment, slits can be provided in the attachment which extend from the openings. Additionally, suitable coupling means can be provided on the ends of the attachment for securing it about the central drum portion.

Other objects, advantages and salient features of the present invention will become apparent from the following detailed description, which taken in conjunction with the annex drawings, discloses a preferred embodiment of the invention.

BRIEF DESCRIPTION OF THE DRAWINGS

Referring to the drawings which form a part of this original disclosure.

DETAILED DESCRIPTION OF THE PREFERRED EMBODIMENT

Figure 1:
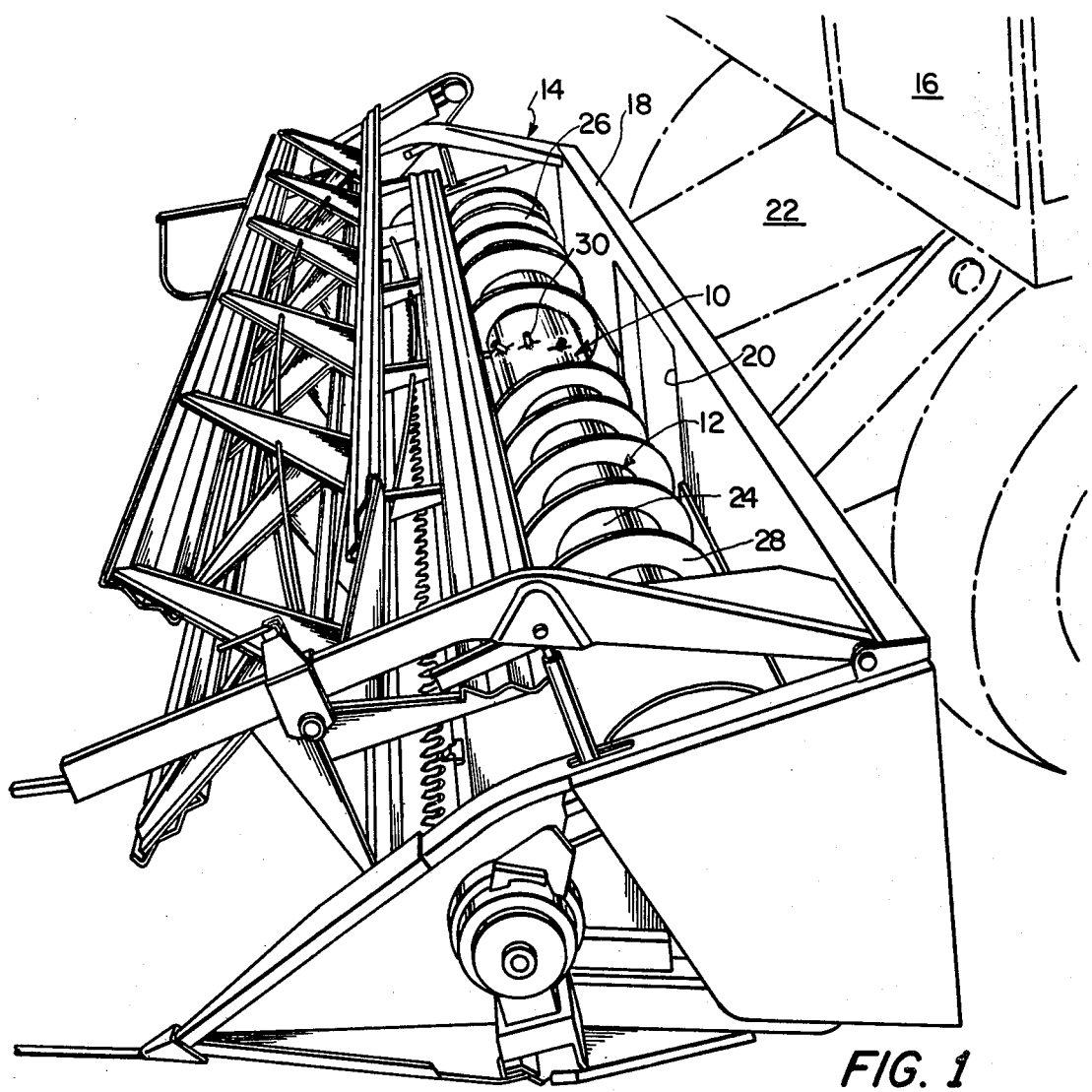
FIG. 1 is a prospective view illustrating a combine header having a feed auger and attachment in accordance with the present invention.

Referring initially to FIG. 1, the resilient attachment 10 formed according to the present invention is mounted on a feed auger 12 of a combine header 14. Combine header 14 is coupled onto the front of a combine 16, illustrated in phantom lines. The rear wall 18 of header 14 includes a feed passageway or throat 20 which communicates with the combine throat 22.

Feed auger 12 is located forward of rear wall 18 and is mounted in the header for rotation about a longitudinal axis extending parallel to rear wall 18 and perpendicular to combine throat 22. The auger comprises a generally cylindrical drum 24 having first and second spiral flights 26,28 mounted adjacent the longitudinal ends of the drum. The flights, upon rotation of the drum, convey vegetation toward the longitudinal center of the auger which is known as the central drum portion. A plurality of feed fingers 30 are mounted in the drum and extend radially from the central drum portion between the spiral flights. Attachment 10 is mounted on the central drum portion and about fingers 30.

Figure 4:
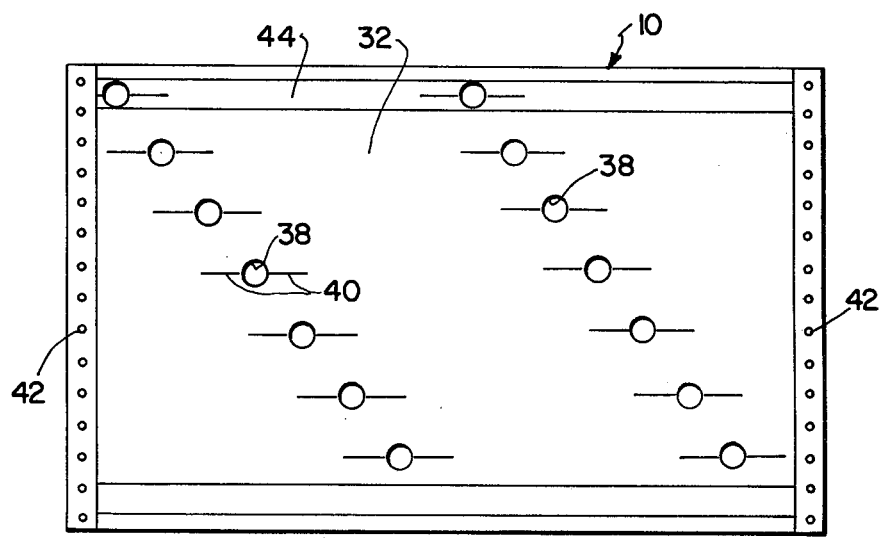
FIG. 4 is a top plan view of the attachment of FIG. 1, laid flat.
Figure 2:
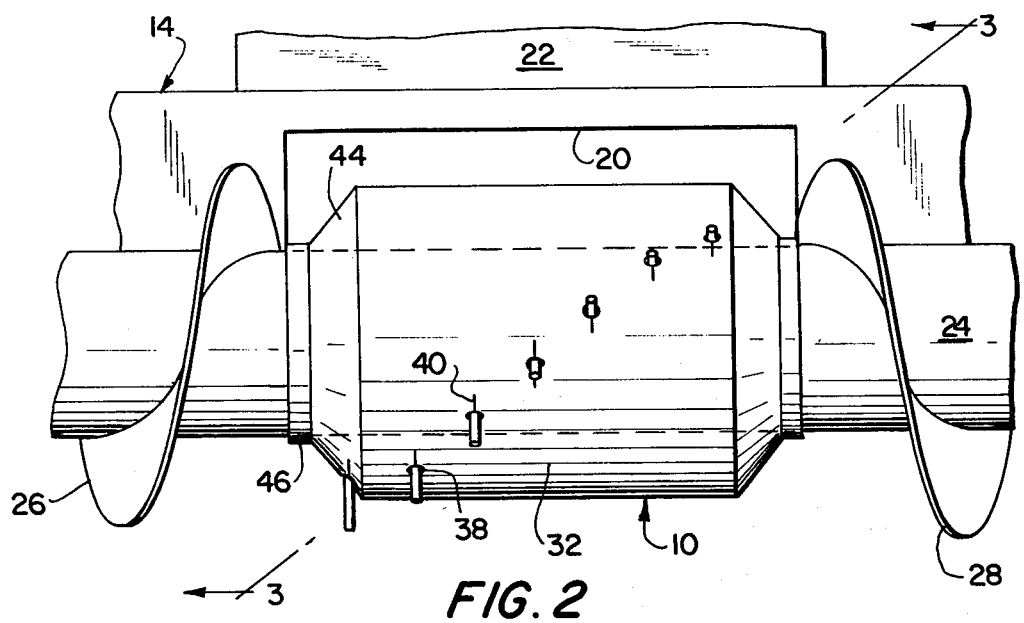
FIG. 2 is a partial, enlarged, front elevational view of the auger and attachment of FIG. 1.
Figure 3:
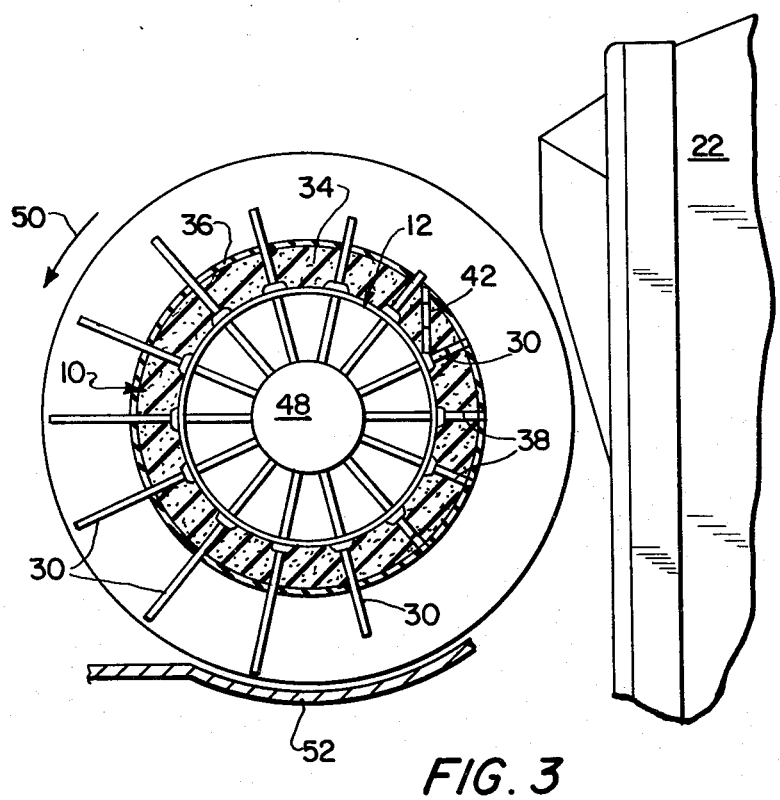
FIG. 3 is a partial, side elevational view in section taken along lines 3—3 of FIG. 2.

Referring to the details of the invention illustrated in FIGS. 2-4, attachment 10 comprises a body member 32 formed of any suitable resilient material. For example, the body member can comprise a foam rubber member 34 encased in a rubber cover 36. Alternatively, body member 32 can be in a form of an air cushion in which two rubber sheets define an inflatable air cell therebetween.

A plurality of openings 38 extend through body member 32 for receiving feed fingers 30. Slits 40 extend from openings 38 towards each end of attachment 10 to permit repair work to be performed on the fingers and bearings therefor without removal of the attachment, to provide play compensating for different angles of movement of the fingers when the auger rotation is reversed, and to facilitate mounting of the attachment over the fingers of the auger. Opening 38 are approximately three-quarters of an inch in diameter, while slits 40 are approximately one and one-half inches long from the center of the opening.

A suitable coupling mechanism 42, e.g., snaps, is provided at each of the opposite ends of body member 32 to attach the body member about the central drum portion of auger 12. Alternatively, the ends of attachment 10 can be secured by an adhesive about the auger central portion. Preferably, a releasable coupling mechanism is provided and located relative to the central drum portion so as to overlie the access door therein. In this manner, maintenance of the auger is facilitated.

As illustrated in FIG. 4, attachment 10 is generally rectangular in plan view. When the attachment is wrapped about the auger central drum portion, the attachment forms a generally cylindrical sleeve. The opposite ends of the sleeve are tapered to define frustoconical surfaces 44 and flat end segments 46. The central portion of body member 32 is approximately two inches thick and tapers at the longitudinal ends of the sleeve (as illustrated in FIG. 2) or at the lateral sides of the attachment (as illustrated in FIG. 4) to the end segments 46 where the attachment is approximately one-eighth inch thick.

Feed fingers 30 are coupled within drum 24 to a reciprocating mechanism 48 of conventional design. Mechanism 48 causes the fingers to reciprocate in a radial direction between radially extended positions and radially retracted positions as auger 12 rotates. Since the thickness of the sleeve in a radial direction is greater than the extension of the fingers in their retracted positions, the fingers completely retract through the thickness of attachment 10.

In operation, attachment 10 rotates simultaneously with auger 12. As the auger rotates in the direction indicated by arrow 50, vegetation is fed directly to or indirectly by the spiral flights 26,28 to the central drum portion of auger 12. The vegetation is then engaged by fingers 30 between auger 12 and bottom wall 52 of header 14 to be forced into feed throat 20.

Resilient attachment 10 prevents the accumulation of vegetation on auger 12 by its wiping action with fingers 30 and by covering all other projections extending from the central drum portion with a relatively smooth surface. Since fingers 30 retract completely through attachment 10 as illustrated in FIG. 3, all vegetation adhering to a retracting finger is forced off the finger and directed towards throat 20. Since the central drum portion projections are covered by the attachment, no vegetation can adhere to them.

A resilient attachment 10 improves the feeding of vegetation by providing a flexible and resilient central drum portion of a larger diameter. Such resiliency and flexibility permits the central drum portion to exert constant pressure on the vegetation regardless of the quantity of vegetation passing between the auger and the header bottom wall. Constant pressure can also be applied even though the vegetation passing under the auger varies along the length of the auger or varies between high and low quantities as the combine moves across the field. The constant pressure applied to the vegetation prevents the vegetation from flaring up to a point where it will not pass through feed throat 20 and causes the vegetation to be contacted with sufficient force to enable it to pass through feed throat 20. Additionally, the flexibility and resiliency of attachment 10 minimize the damage to the crop and prevent the crop from being dislodged from its vines maximizing the quantity of crop passing into throat 20 for further processing within the combine.

Thus, the present invention provides a more even flow of material passing under the auger, as well as preventing the accumulation of vines. The downward and rearward pressure exerted on the vegetation by the resilient attachment 10 as the vegetation leaves the auger and enters the throat further directs the vegetation into the throat. This downward and rearward pressure also assists the removal of the vegetation from the fingers and decreases the tendency of the vegetation to flare up.

The covering provided by attachment 10 also protects the auger from damage from such debris as rocks.

Although the invention has been described in considerable detail with particular reference to a certain preferred embodiment thereof, variations and modifications can be effected within the spirit and scope of the invention as defined in the appended claims.

What is claimed is:

1. A feed auger for a combine header and the like, comprising:
   a generally cylindrical drum with means for mounting said drum for rotation about a longitudinal axis and with an outer surface;
   first and second spiral flights mounted on said drum adjacent longitudinal ends thereof;
   a central drum portion between said flights;
   a plurality of feed fingers coupled to said drum and extending radially from said central drum portion; and
   resilient and flexible attachment means mounted on and extending radially from said central drum portion about said fingers, and exposed over said outer surface.

2. A feed auger according to claim 1 wherein said resilient means comprises a sleeve formed of resilient material surrounding said central drum portion.

3. A feed auger according to claim 2 wherein said sleeve has a plurality of openings receiving said feed fingers.

4. A feed auger according to claim 3 wherein said feed fingers are coupled to reciprocating means, located within said drum, for moving said fingers between radially extended and radially retracted positions as said drum rotates.

5. A feed auger according to claim 4 wherein said sleeve has a radial thickness greater than the extension of said fingers from said central drum portion in said retracted positions, such that said fingers completely retract through said sleeve.

6. A feed auger according to claim 3 wherein said sleeve has slits extending from said opening facilitating mounting of said sleeve on said central drum portion.

7. A feed auger according to claim 2 wherein said sleeve has tapered longitudinal ends.

8. A feed auger according to claim 2 wherein said sleeve is formed of foam rubber.

9. A feed auger according to claim 1 wherein said resilient attachment means comprises a substantially rectangular member placed about said central drum portion.

10. A feed auger according to claim 9 wherein said member includes coupling means for attaching longitudinal ends of said member.

11. A feed auger according to claim 9 wherein said retangular member has openings receiving said feed fingers.

12. A resilient attachment for a feed auger of the type having a cylindrical drum mounted for rotation about a longitudinal axis, spiral flights mounted on opposite longitudinal ends of the drum, and a central drum portion having a plurality of feed fingers extending radially therefrom, the attachment comprising:
   a body member of resilient and flexible material;
   a plurality of openings extending through said body member for receiving the feed fingers; and
   coupling means, located at opposite ends of said body member, for attaching said body member about the central drum portion.

13. A resilient attachment according to claim 12 wherein slits extend from said openings in said body member.

14. A resilient attachment according to claim 13 wherein said slits extend toward said coupling means.

15. A resilient attachment according to claim 12 wherein said body member is generally in the form of a rectangular solid.

16. A resilient attachment according to claim 12 wherein said body member is tapered at lateral edges thereof.

17. A resilient attachment according to claim 12 wherein said body member is formed of foam rubber.

18. A resilient attachment according to claim 12 wherein said body member has an outer cover of rubberized material.

19. A feed auger for a combine header and the like, comprising:
   a generally cylindrical drum with means for mounting said drum for rotation about a longitudinal axis and with an outer surface;
   first and second spiral flights mounted on said drum adjacent longitudinal ends thereof;
   a central drum portion between said flights;
   resilient and flexible attachment means mounted on and extending radially from said central drum portion between said spiral flights, and exposed over said outer surface.

20. A feed auger according to claim 19 wherein said resilient means comprises a sleeve formed of resilient material surrounding said central drum portion.

21. A feed auger according to claim 19 wherein said resilient attachment means comprises a substantially rectangular member placed about said central drum portion.

22. A resilient attachment for a feed auger of the type having a cylindrical drum mounted for rotation about a longitudinal axis, spiral flights mounted on opposite longitudinal ends of the drum, and a central drum portion between the spiral flights, the attachment comprising:
   a body member of resilient and flexible material; and
   coupling means, located at opposite ends of said body member, for attaching said body member about the central drum portion.

* * * * *